(No Model.) 8 Sheets—Sheet 1.
E. A. PECK.
HARVESTING MACHINE.
No. 502,861. Patented Aug. 8, 1893.
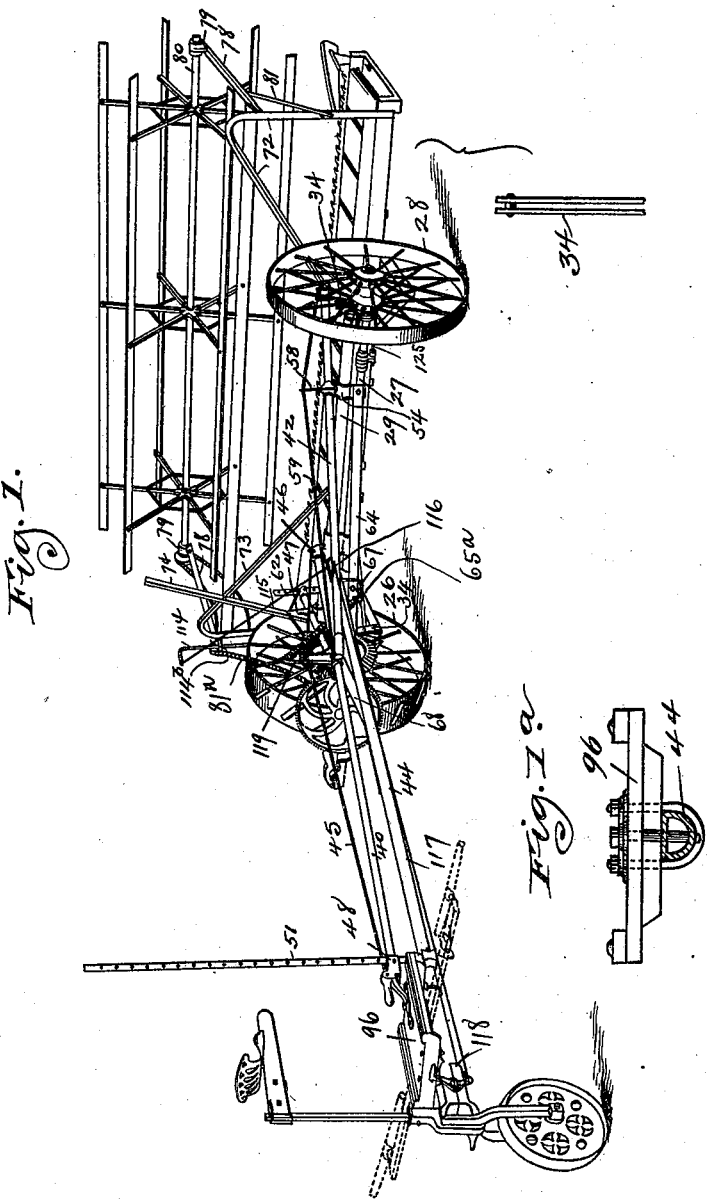
Witnesses,
J. T. Mann
F. H. Goodwin
Ezra A. Peck Inventor,
By Offield, Towle & Linthicum
Attys.

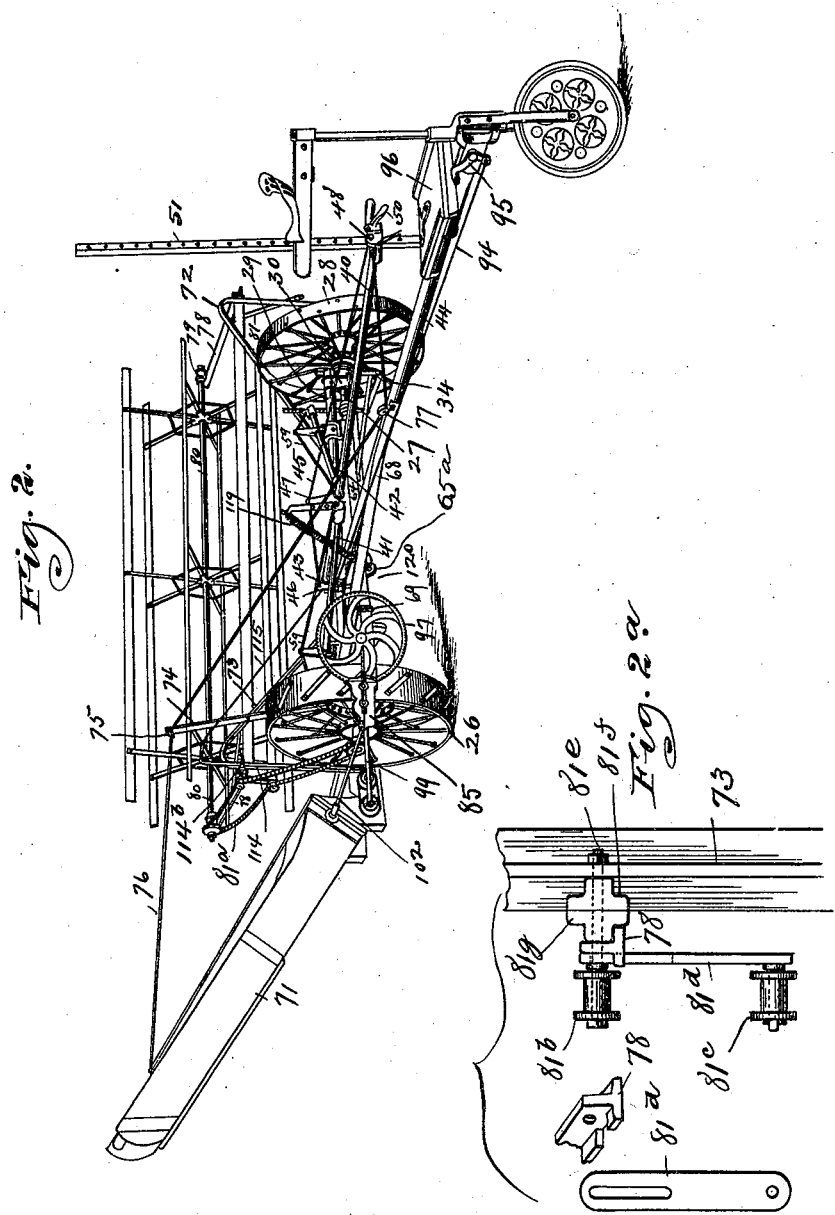

(No Model.)  8 Sheets—Sheet 3.
E. A. PECK.
HARVESTING MACHINE.
No. 502,861. Patented Aug. 8, 1893.
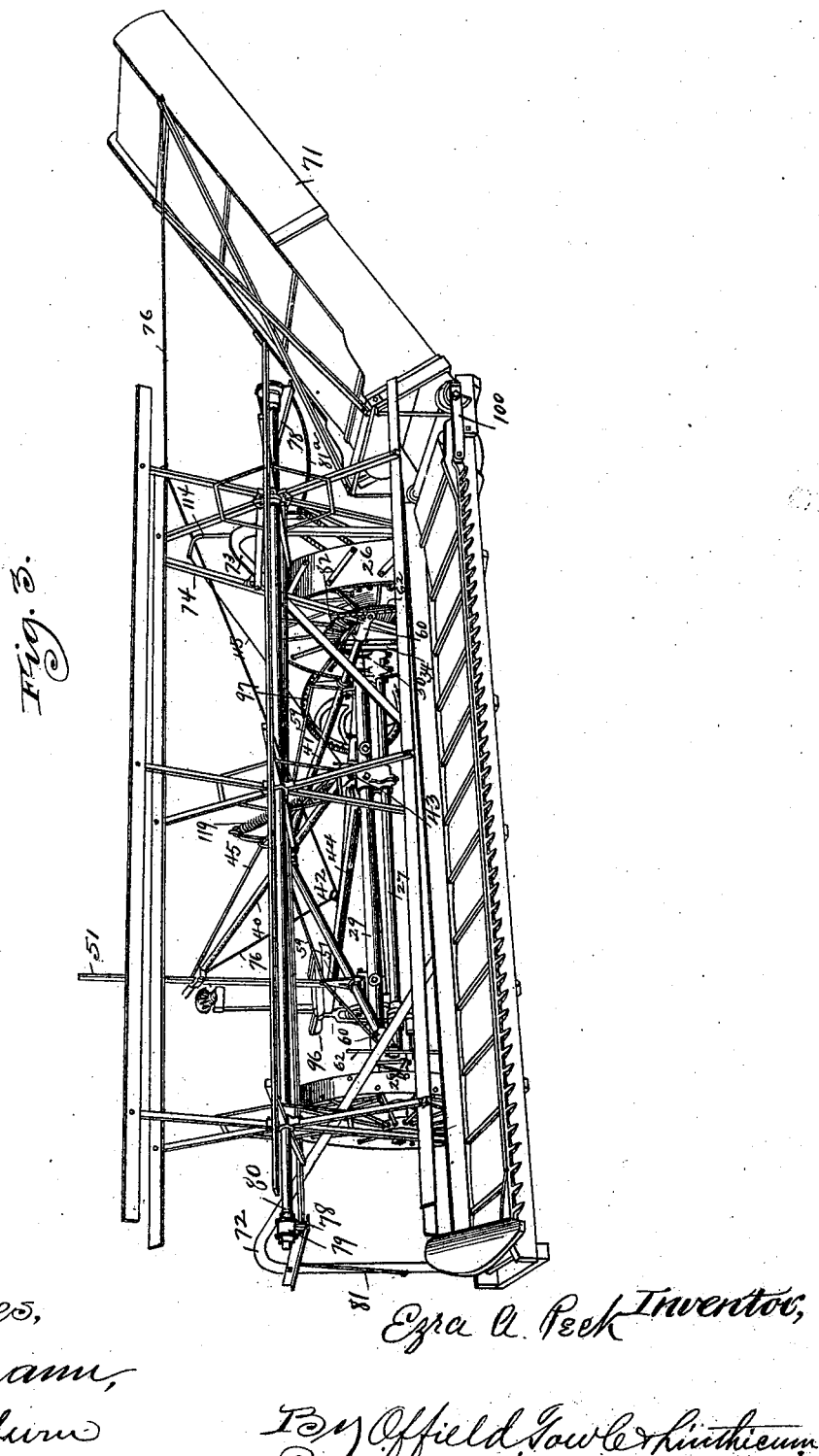
Witnesses,
J. J. Mann,
F. C. Goodwin
Ezra A. Peck, Inventor,
By Offield, Towle & Linthicum
Attys.

(No Model.) 8 Sheets—Sheet 4.
E. A. PECK.
HARVESTING MACHINE.
No. 502,861. Patented Aug. 8, 1893.
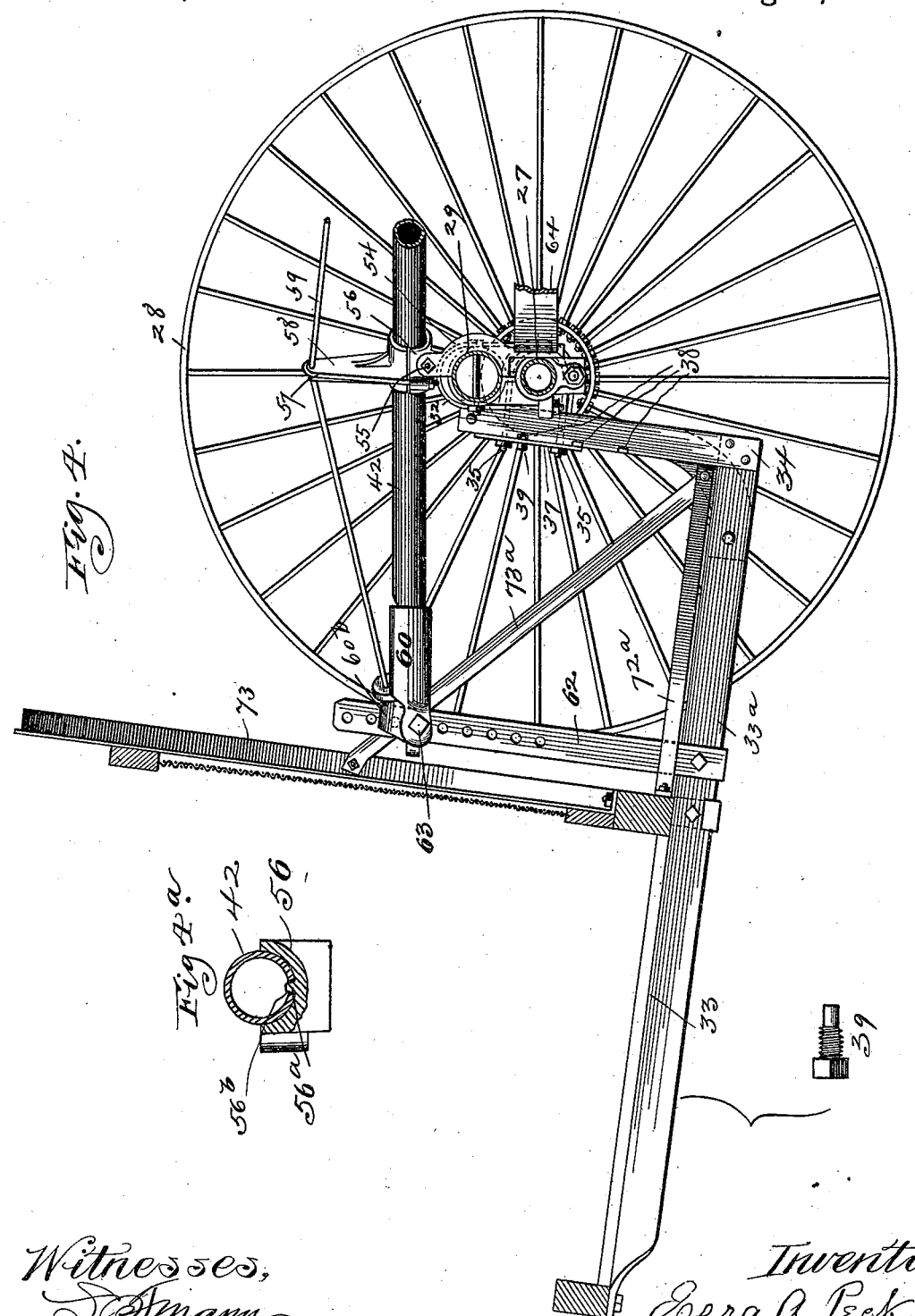
Witnesses,
J. F. Mann,
F. H. Goodwin.
Inventor,
Ezra A. Peck
By Offield, Towle & Linthicum
Attys.

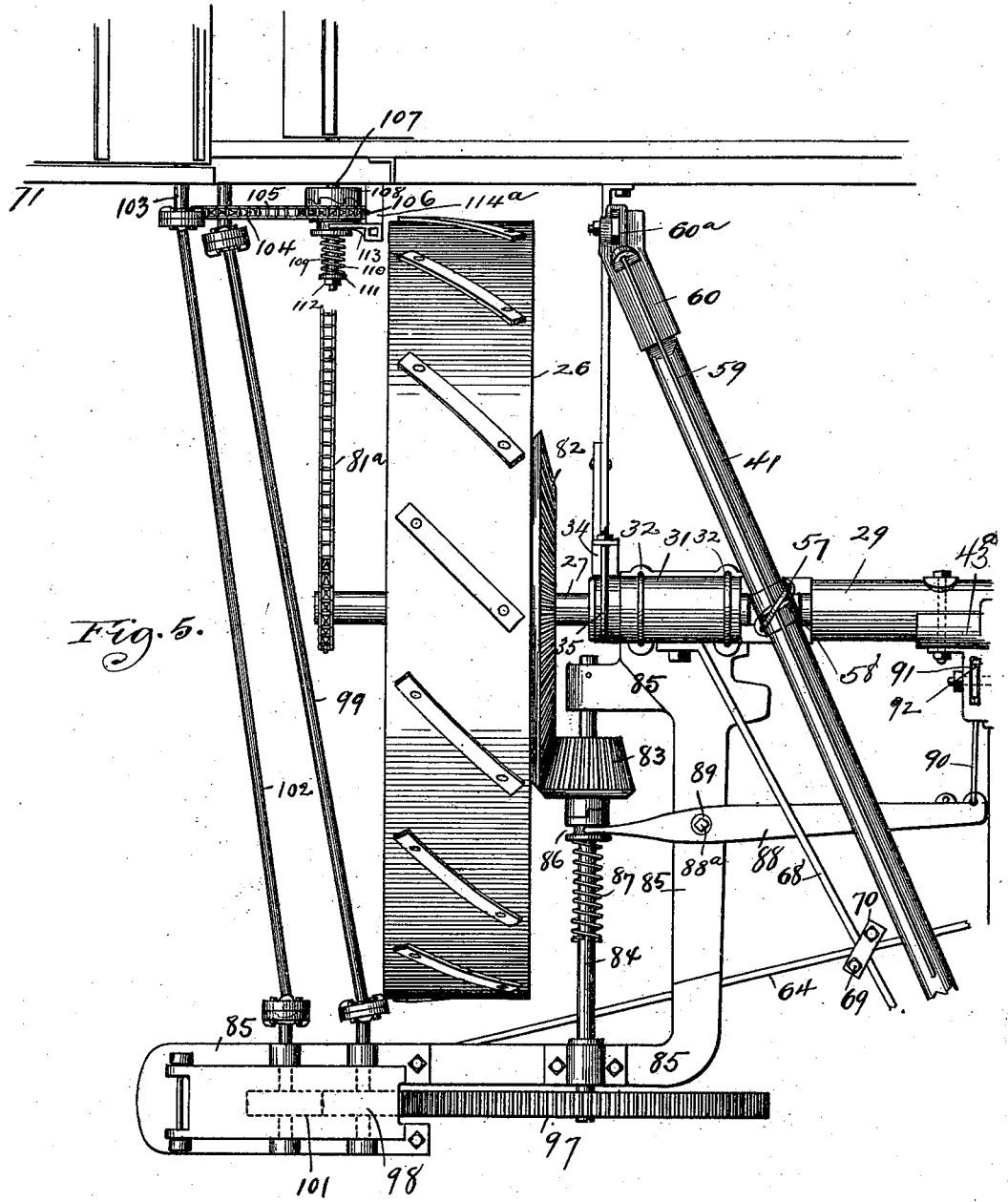

(No Model.) 8 Sheets—Sheet 6.
E. A. PECK.
HARVESTING MACHINE.
No. 502,861. Patented Aug. 8, 1893.
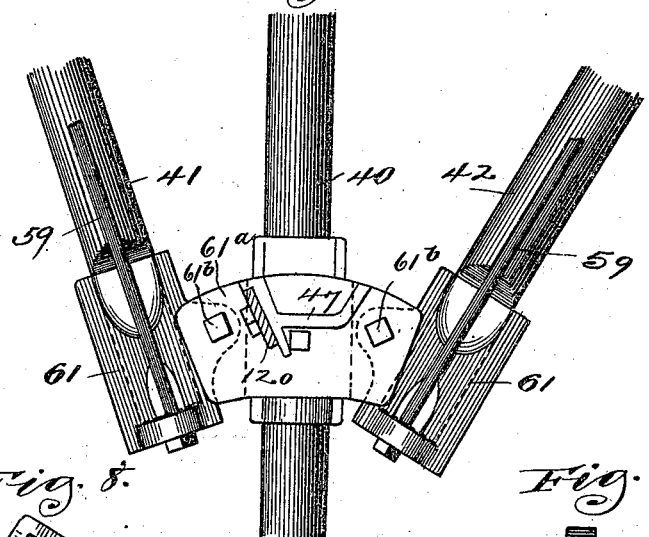
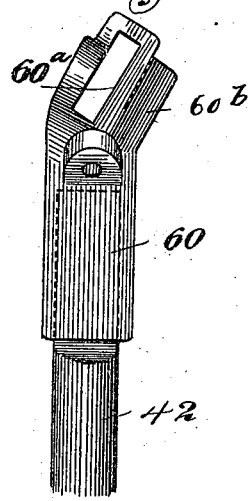 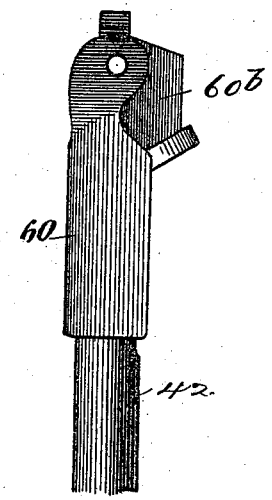
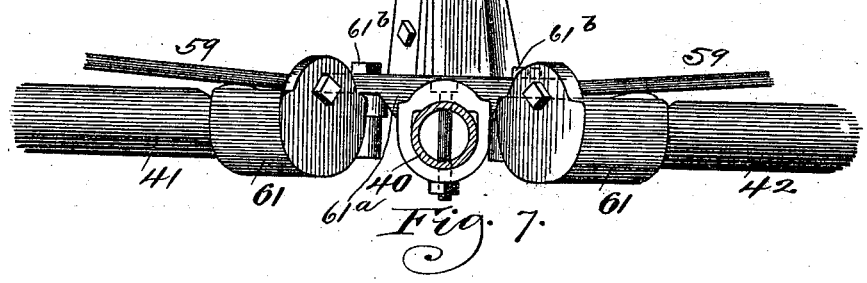
Witnesses,
Ezra A. Peck Inventor
By Offield, Towle & Linthicum
Attys

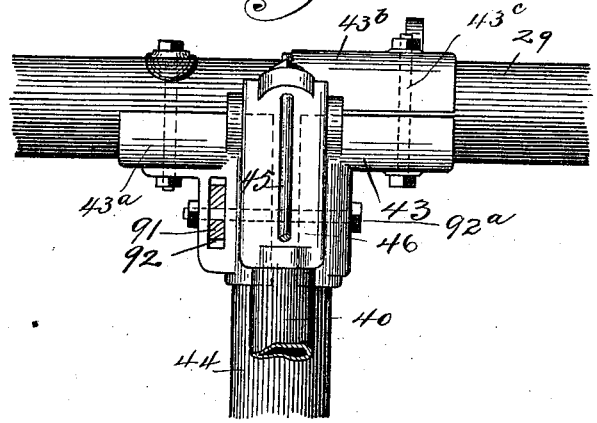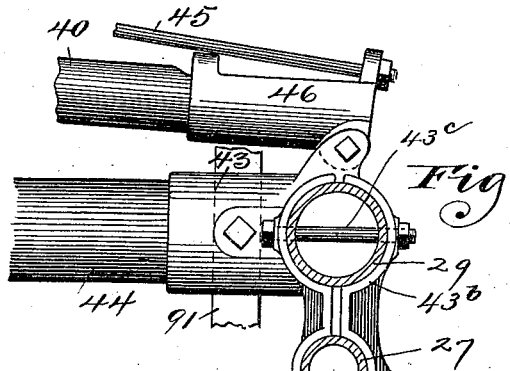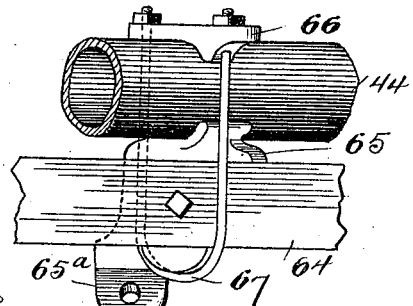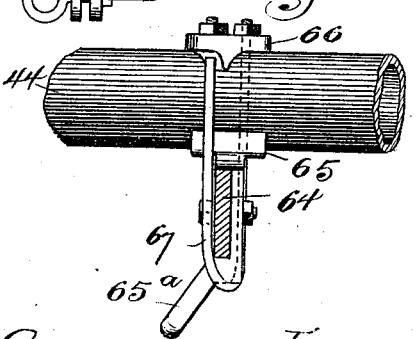

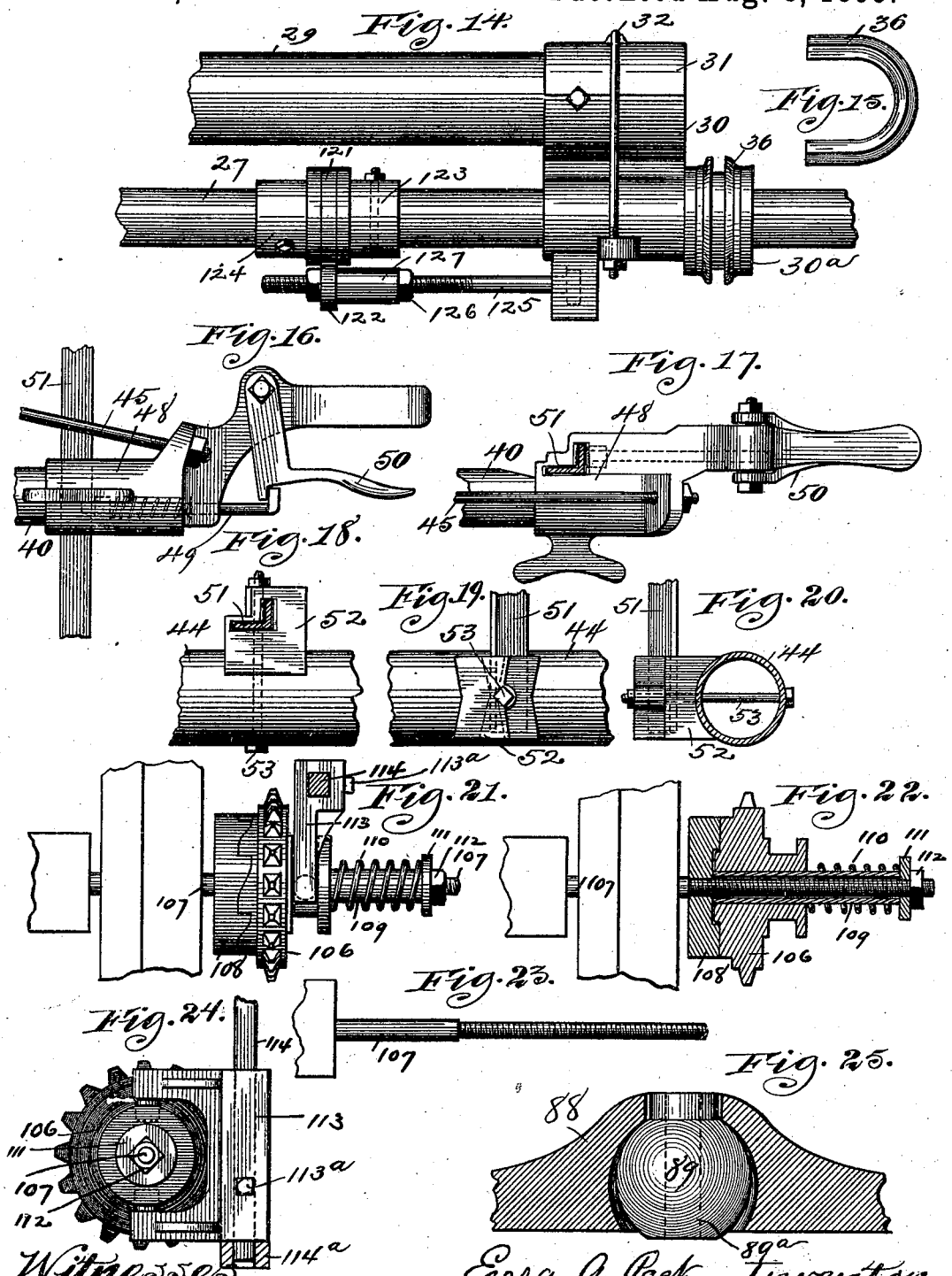

UNITED STATES PATENT OFFICE.

EZRA A. PECK, OF HARVEY, ILLINOIS, ASSIGNOR TO CHARLES F. CRAVER, OF SAME PLACE.

HARVESTING-MACHINE.

SPECIFICATION forming part of Letters Patent No. 502,861, dated August 8, 1893.

Application filed July 18, 1892. Serial No. 440,340. (No model.)

*To all whom it may concern:*

Be it known that I, EZRA A. PECK, of Harvey, in the county of Cook and State of Illinois, have invented certain new and useful Improvements in Harvesting-Machines, of which the following is a specification.

My invention relates to a harvesting machine of the class known as "headers" in which the cutting parts of the machine are mounted upon a main frame provided with a rearwardly projecting push pole or tongue to which the team is attached, and having a driver's platform with a tiller wheel at the rear end of the pole and behind the team.

The object of my invention is to improve the construction and operation of machines of this class, and this I accomplish mainly by balancing the cutting and elevating devices over the axle so that said parts rock over the gear center and are readily adjustable with relation thereto. I prefer to make the frame work of the machine of metal pipes or tubes, whereby the maximum strength and rigidity are secured with economy of weight and cost.

In machines of this general class, the grain platform and elevator and their connected parts have been mounted upon a supplemental frame pivotally hung beneath the main or driving axle. In my construction the grain platform is suspended from the axle by means of posts or standards connected to the rear ends of the platform sills, said standards being pivotally supported at their upper ends from the axle and vertically adjustable with reference thereto so as to level the platform. Above the axle is mounted a beam which forms the fulcrum for a tilting lever, the latter consisting of a main lever of pipe and two branch levers of pipe, the latter being pivoted over said beam and having their forward ends adjustably connected with hangers rising from the platform so that a set adjustment of the platform can be made. The rear end of the main tilting lever extends back to the driver's platform and it is there adjustably connected with a notched or ratchet standard so that it may be readily raised or lowered by the driver, and thus the variable adjustment of the platform is placed within the control of the driver. By means of these adjustments a ready variation of height of cut can be obtained and the platform leveled.

I have provided a novel arrangement of the gearing whereby the reel and sickle may be run while the platform apron is held against movement, thus permitting the grain to accumulate upon the platform in turning the machine at corners and while changing wagons, whereby waste is prevented. I have also improved the means for suspending the elevator and for adjusting the parts for keeping the gears in mesh, as well as other features which will be hereinafter fully described and more particularly pointed out in the claims. In this machine the main frame and platform are adapted to be locked together by the adjusting levers but are capable of being adjusted with relation to each other while the platform is adjustable as to height and is also capable of rocking around said axle and the fulcrum for the tilting lever also rocks independently of the rotative movement of the axle and of the rocking movement of the platform around the axle.

In the accompanying drawings, Figures 1, 2, and 3 are perspective views of the machine, the elevator being omitted in Fig. 1. Fig. 1$^a$ is a detail view of the push pole at its connection with the driver's platform. Fig. 2$^a$ is a detail view of a tension device for the reel driving chain. Fig. 4 is a transverse sectional elevation through the platform and axle. Fig. 4$^a$ is a detail view of the tilting lever and rest block. Fig. 5 is a plan view of the drive wheel, particularly designed to show the gearing and showing parts of the platform and of the tilting frame. Figs. 6, 7, 8, and 9 are detail views of the tilting frame, the first being a broken plan showing the connection of the three beams to each other which make up the tilting frame. Fig. 7 is an end view of the same, and Figs. 8 and 9 are detail views of the forward ends of the branch beams of the frame. Figs. 10 and 11 are detail views, the former in plan and the second in side elevation, showing the connection of the front end of the main beam of the tilting levers. Figs. 12 and 13 are detail perspective views of the connection between the push pole and a brace therefor. Fig. 14 is a detail view showing a take-up device which is used to secure proper mesh of the gears. Fig. 15 is a side view of a U-shaped casting fitted over the axle and adapted to receive a U-bolt which pivotally connects the platform and axle. Figs. 16 and 17 are detail views in side elevation and plan respectively of a locking device for adjustably connecting the rear end of the main beam of the tilting frame with the standard at the driver's platform. Figs. 18, 19, and 20 are detail views of the connection of the standard to the push pole. Figs. 21, 22, 23, and 24 are detail views of the mechanism for throwing the apron into and out of gear; and Fig. 25 is a detail view of a ball bearing applied to the main clutch lever of the machine.

In the drawings, 26 represents the driving wheel which is secured to the axle 27. This axle is preferably a metal tube and upon its outer end is journaled the ground wheel 28. Mounted above the axle 27 is a tubular beam 29, said beam being mounted upon castings 30 having caps 31 and U-bolts 32 for clamping them to the axle.

33 represents the grain platform whose sills $33^a$ are constructed from metal bars and project rearwardly and are secured to the standards 34 which are formed of a straight bar set edge-wise with reference to the axle and a second bar also edge-wise disposed and having its lower end curved, as clearly shown in Fig. 4 by the dotted lines, so as to brace the platform. The upper ends of said bars, forming the standards, are slightly separated to receive between them the ends of a U-bolt 35 which is fitted about a U-casting 36, (Figs. 14 and 15,) said casting being mounted upon a lateral extension $30^a$ of casting 30. The ends of the U-bolt 35 pass between the members of the standard 34 and through a clamping plate 37. The edge of the straight member of the standard is notched, as at 38, and a peculiarly shaped set screw 39, shown as a part of Fig. 4, has its threaded portion passing through the clamp, and a round end adapted to enter the notches 38 in the edge of the standard bar. By manipulating this set screw its end can be withdrawn from the seats or notches and the platform, which is balanced over the gear center, can be raised or lowered by one person.

The adjustment of the rear edge of the platform through the standards and the means just described above enables the platform to be leveled after it has been raised or lowered in order to vary the height of stubble.

The platform and its accessories are virtually suspended by means of combined tilting and suspension levers. These levers are made from pipe, the central or main lever being marked 40 and the branch levers 41—42. The main lever is pivoted at its forward end, as shown in Figs. 10 and 11, to a three part casting. The members of said casting are marked 43, $43^a$ and $43^b$, the members 43 and $43^a$ being L shaped and adapted to embrace the push pole and beam and having perforated lugs to which the lever 40 is pivoted, and dependent portions forming parts of the bearing for the axle 27. The casting $43^b$ embraces the tubular beam 29 and axle 27 and is clamped to the former by the bolt $43^c$. The rear end of said pole is flattened, as seen in Fig. $1^a$, to receive the driver's platform and is adapted to enter a flattened sleeve connected with the caster wheel frame. The flattening of the pole enables the connected parts to be easily aligned, and also furnishes a suitable flat surface to receive the double trees. A truss rod 45 holds a sleeve 46 having one flat side upon the end of the main lever 40, said truss rod extending back over a strut 47 and its rear end being connected with a sleeve 48 forming one member of a locking device for the rear end of said lever. The sleeve 48 has a spring actuated dog 49 controlled by a pivoted latch 50 and said dog is adapted to take into the notches or locking seats of an angle iron standard 51 which is mounted in a block or bracket 52 confined by a bolt 53 to the pole 44. The block 52 is cut away, as clearly shown in Figs. 18 and 19, so as to allow the standard a slight rocking movement around its pivot bolt to compensate for the angular adjustment of the tilting lever with reference to the push pole.

The combined suspension and tilting bars 41—42 are pivoted over the beam 29, as clearly shown in Fig. 4 of the drawings. This pivotal connection is formed by a hanger 54 which is bolted to beam 29, as seen in Fig. 4, and depends below said beam along-side the axle having a seat therein to receive a brace to be hereinafter described. This hanger carries a pivot bolt 55 therein which passes through a rest 56 having perforated lugs thereon to receive branches of a U-bolt 57 passing over a strut 58, clamping rest 56 and strut 58. The rest has a pin $56^a$ to enter a hole $56^b$ in levers 41—42 in order to center and secure them against movement.

The suspension levers 41, 42 each have their ends flattened to receive flattened sleeves provided with perforated lugs through which the ends of the truss rods are passed and nuts are used for tensioning said rods. The object in flattening these tubular levers is to secure perfect alignment between their pivot pins 55 and the adjusting pins at their forward ends whereby they are connected to the platform hangers. This simple expedient of flattening these tubes at their ends and correspondingly flattening the sleeves themselves enables the sleeves to be put on in line so that the parts can be accurately fitted without special care. These sleeves are particularly shown in Figs. 6, 7, 8, and 9, the sleeves at the forward end being marked 60 and those at the rear end 61. The sleeves 61 are pivotally connected to the casting $61^a$ by the vertical pivots $61^b$, and this construction permits the tilting bars 41—42 to be swung on their pivots and folded compactly together and in line with the central member of the tilting lever for storage or shipment, or to be readily detached and separately shipped without removing their truss rods and sleeves. It also enables them to be readily adjusted to their proper position or bearing upon the axle in setting up the machine. The sleeves 60 each have elongated apertures or slots 60$^a$ therein to receive the hangers 62 which rise from the platform and the pins 63 furnish means for setting the platform at any desired height, and through these levers 41—42 and the hangers 62 and their pins the entire grain platform with its accessories is hung upon and can be rocked over the gear center or main driving axle. The sleeve 60 has the lug 60$^b$ thereon which serves as a fulcrum for a lever, the end of which may be inserted in the holes of the hanger in order to raise or lower the platform. It will be seen that there are thus provided three separate and distinct adjustments which cover as wide a range as will ever be needed in machines of this class. First, there is provided what I term the leveling adjustment which can be made by raising or lowering the rear edge of the platform and the standards; second, the variable adjustment which is made at the driver's platform and is always under his control; and, third, the set adjustment which can be made by raising or lowering the front ends of the levers 41—42 with reference to the platform.

By reference to Figs. 1, 2 and 5, particularly the latter, will be seen two diagonal brace bars one of which is marked 64 and is intended to brace the gear frame, the forward or outer end of said brace bar being secured to beam 29 by means of the seat in the hanger 54 before mentioned, (Fig. 4) and the inner or rear end is secured to the gear frame 85, as will be seen by Fig. 5 where the brace passes underneath said frame. Said brace 64 at one point passes under the push pole and the connection is clearly shown in Figs. 12 and 13 and consists of the rest block 65, the clamp 66 and the U bolt 67. The second brace 68, shown in Figs. 2 and 5, has its forward end connected at the beam and its rear end projects back and is bolted to the pole as seen in Fig. 2. These braces cross each other, as seen in Fig. 5, and at their point of crossing they are connected by the U-bolt 69 and clamp 70.

The grain platform carries the reel and elevator and a feature of my invention relates to the means for mounting said reel and elevator. The elevator is marked 71 and is pivoted at its lower end to the platform and inclines upwardly therefrom.

In the operation of machines of this class, the weight of the elevator and its peculiar location make it difficult to support it. I support both the reel and elevator by means of the A-frame members 72—73, these members being arranged in line with each other and length-wise of the platform. The A frame members are each constructed of one continuous piece which is bolted at its lower ends to the platform and braced by the horizontal brace 72$^a$ and the diagonal brace 73$^a$, both of which have their rear ends connected to a curved bar of the standard 34. A brace 74 has its lower end secured rigidly and extends forward diagonally across and is clamped to the A frame member 73 and in its upper end carries a swiveling pulley 75 through which the suspension cable 76 passes, one end of said cable being made fast to the elevator and the other being carried beneath the sheave 77 and wound on a projection of the locking device for the tilting lever at the driver's platform. This puts the inclination of the elevator within the control of the driver without leaving his station. A further advantage of this construction is that the elevator is thus adjusted in exact correspondence with the manipulations of the tilting lever. As the tilting lever is raised, dropping the platform, the elevator is moved toward a vertical position thus compensating by its angularity of adjustment for its vertical depression.

On the A frame members 72—73 are bolted the T-irons 78 which carry the bearing 79 for the reel shaft 80. These T-irons are braced by the rods 81.

81$^a$ is the reel chain which has its strands carried over the sheaves 81$^b$, 81$^c$, (Figs. 2 and 2$^a$,) the latter being mounted on an arm 81$^d$ which is vertically slotted for the passage of bolt 81$^e$ which passes through the hub of sheave 81$^b$, the web of T-bar 78, the washers 81$^f$ and 81$^g$ and through the web of the A frame member 73, all of which are securely clamped together by bolt 81$^e$, and one flange of the head of the T-bar 78 is notched to form guides for slotted arm 81$^d$ whereby this arm is prevented from swinging on its pivot under the pull of the chain.

The arrangement of the A frame members adapts them to serve as braces or trusses for the platform, the hangers whereof rise intermediate the attached ends of the members respectively, and they also furnish a secure abutment against which the brace rests carrying the pulley for the suspension cable of the elevator. The upper end of this brace projects to a point in line with the middle of the elevator and bears on the diagonal member of the A frame. Its lower end is connected to the sill in the rear of the elevator and taken in conjunction with the A frame member it braces the entire platform and its connected parts.

I have made a novel arrangement of the gearing of this machine which I will now describe. By reference to Fig. 5 it will be seen that the ground wheel 26 which is keyed to the axle has a beveled gear 82 secured therewith. This gear meshes with a beveled pinion 83 on a shaft 84 mounted in bearings in a gear frame 85, one end of which frame is connected to the beam over the driving axle. The pinion 83 has a clutch hub and a sliding clamp member 86 is normally engaged therewith by means of the spring 87. The clutch is controlled by the lever 88 having a ball bearing 89, (Fig. 25) on frame 85. Lever 88 is clamped upon the ball 89 by means of the bolt $88^a$ which passes through an aperture $89^a$ in the ball, indicated by the dotted lines in Fig. 25. This lever 88 has a link 90 pivotally connecting it with an upright lever 91 which is pivotally secured in a slotted aperture 92 of the casting $43^a$ by bolt $92^a$, which passes transversely through the castings 43 and $43^a$ and push pole 44 as shown in Fig. 10. A cord 94 is connected to the upper end of said lever and is carried back to the foot treadle 95 in the vicinity of the driver's platform 96. This clutch controls the running of the sickle and of the apron and elevator belt. Shaft 84 drives the sickle through the gears 97—98, tumbling rod 99, and pitman 100, and it also drives the elevator belt through the gears 97, 98, 101, tumbling rod 102, and elevator shaft 103. The tumbling rod 99 carries a sprocket wheel 104 and a link belt 105 is turned over a sprocket wheel 106 on a shaft 107 which drives the platform apron.

By reference to Figs. 21 to 24 inclusive, the construction of these parts will be best understood. The shaft 107 has its projecting end threaded for a considerable distance, as seen in Fig. 23, and on this threaded portion is first turned a fixed member 108 of a clutch the other member whereof is formed on sprocket wheel 106. A sleeve 109 is slipped over the threaded end of the shaft and through the hub of the sprocket wheel, and the spring 110 is coiled about the sleeve and is confined with one end in contact with the hub of the sprocket wheel 106 by the washer 111 and nut 112.

113 represents a shipper fork which engages the hub of sprocket wheel 106 and the hub of this shipper fork has a vertical aperture through which a rod 114 passes. A set screw $113^a$ secures the shipper fork to the rod 114. The lower end of rod 114 is seated in a bracket $114^a$ (Figs. 5 and 24) and its upper end passes through an apertured casting $114^b$ on the A frame 73. (See Fig. 1.) The upper end of rod 114 is cranked and a cable 115 is connected to said crank and to one member of a bell crank 116 pivoted on the pole 44. A cable 117 connects the other member of the bell crank with a foot treadle 118 at the driver's platform. The spring 110 normally holds the sprocket wheel in clutch, but in order to make the gearing controllable by the driver, the connections just described are provided. By depressing the foot treadle, the driver may throw the sprocket wheel out of gear and thus stop the running of the platform apron and permit the grain to accumulate thereon while the machine is turning corners or while the wagons are being changed.

In order to counter-balance the weight of the front part of the machine and render it easily adjusted by the tilting levers, I have shown a spring 119 having its lower end secured to a lug $65^a$ on casting 65, (Figs. 12 and 13) and its upper end connected to an arm 120 on strut 47, (Fig. 7.) The normal tendency of this spring is to tilt the lever and thus it is made to assist the operator in adjusting the machine. It will be seen that this spring is arranged in an inclined position so that when the rear end of the tilting lever is raised through a considerable distance the spring is only slightly elongated.

In order to secure proper results from machinery of this class, it is necessary to provide for keeping the gearing in proper mesh. I desire to accomplish this without the necessity for dismantling the machine or the removal of any of its parts, and to this end I have applied a take-up device to the main axle which is illustrated in detail in Fig. 14 of the drawings and is also seen, as to some of its parts, in Fig. 1. This take-up device comprises a collar 121 secured on the axle by a fixed collar 123 and an adjustable collar 124. An adjusting bolt 125 having a threaded end passing through the perforated lug 122 has the nuts 126 applied thereto and a thimble 127 may also be employed. The head of this bolt, shown in dotted lines in Fig. 14, is confined in a socketed lug on casting 30 which supports beam 29. By adjusting these nuts the axle may be drawn bodily through the beam supports, thus moving the driving wheels and its bevel gear into proper mesh with the beveled pinion 83.

It is obvious that many of the structural details may be omitted or varied and that some of the improvements herein-above described may be employed in a machine where others of said improvements are not used.

Without limiting myself, therefore, to precise details of construction, I claim—

1. In a harvesting machine of the class described, the combination with the driving wheels and axle, of a platform pivotally connected to the axle and adapted to rock thereon, and a rigid tilting lever fulcrumed at the axle and having its forward end projected over and pivotally connected to the platform and its rear end projected to the driver's seat, whereby the front of the platform may be adjusted as to height without varying its relation to the moving parts of the machine, substantially as described.

2. In a harvesting machine of the class described, the combination with the main axle and driving wheels, of a platform having standards or uprights rigidly connected to the rear edge of the platform, said standards being projected up in front of the axle and pivotally connected at their upper ends thereto, a tilting lever fulcrumed over the axle and projected forward over the platform, and hangers pivotally connecting the forward end of said tilting lever with the platform, substantially as described.

3. In a harvesting machine of the class described, the combination with a rotatable driving axle and ground wheels, bearings in which said axle turns, a beam mounted upon said bearings above and parallel to the axle, a platform, standards rigidly connected with the platform at their lower ends and pivotally connected at their upper ends with the bearings which support the beam, a tilting lever fulcrumed upon the beam, and a hanger adjustably connecting the forward end of the tilting lever and the platform in front of the beam and axle, substantially as described.

4. In a harvesting machine of the class described, the combination with the driving axle and ground wheels, of grain platform standards pivotally connected to the driving axle at their upper ends and rigidly connected to the platform at their lower ends, a beam mounted parallel to and above the main axle and a tilting lever composed of three members, two of which are fulcrumed over said beam and diverge at their forward ends and the third member being pivotally connected at its forward end above the beam and its rear end projected to the driver's seat, and hangers rigidly connected to the platform at their lower ends and pivotally connected to the projected ends of the tilting members substantially as described.

5. In a harvesting machine of the class described, the combination with the driving wheels and axle, of a platform pivotally connected to the axle and adapted to rock thereon as an axis, a tilting lever composed of three tubular beams, one pivoted at its forward end at the axle and extended rearwardly at right angles thereto to the vicinity of the driver's seat, and the other two of said beams being rigidly connected with the first, fulcrumed over the axle and arranged diagonally thereto, said diagonal beams having one side of their ends flattened, sleeves adapted to said ends, struts mounted on the beams, and truss rods connected to the sleeves and tensioned by the struts, substantially as described.

6. In a harvesting machine of the class described, the combination with the driving wheels and axle, of a platform pivotally connected to the axle and adapted to rock thereon as an axis, a tilting lever composed of three tubular beams, one pivoted at its forward end at the axle and extended rearwardly at right angles thereto to the vicinity of the driver's seat, and the other two of said beams being rigidly connected with the first, fulcrumed over the axle and arranged diagonally thereto, said diagonal beams having one side of their ends flattened, sleeves flattened to adapt them to the ends of the beams and provided with lugs, truss rods connecting the lugs at the respective ends of the beams, and struts mounted upon the beams and tensioning the truss rods, substantially as described.

7. In a harvesting machine of the class described, the combination with a pivoted platform, of a hanger secured at its lower end to the platform, a tilting lever composed of beams pivoted over the axle, sleeves applied to said beams, truss rods for confining the sleeves to the beams, said sleeves having apertures for the passage of the platform hanger and a lug on the sleeves to provide a fulcrum whereby the platform may be adjusted by the application of a pry to the hanger over said fulcrum, substantially as described.

8. In a harvesting machine of the class described, the combination with a main axle, ground wheels and tilting platform, of a tubular beam mounted parallel to and above the axle, and bearings mounted on the axle and having seats therein for the beam and a lateral portion forming a bearing from which the platform is pivotally supported, substantially as described.

9. In a harvesting machine, the combination with the axle, of a beam mounted parallel to and above the axle, of the bearing 30 having the lateral projection 36, the cap 31 and the clamping bolt 32, substantially as described.

10. In a harvesting machine of the class described, the combination with the axle and ground wheels, of a tubular beam mounted above and parallel to the axle, a casting clamped upon the beam, a pivot bolt mounted in lugs on said casting, a rest block mounted upon said bolt, a tilting lever mounted in said rest block, a strut mounted on the tilting lever, a U-bolt for clamping the strut and rest block together, and a truss rod for the beam which is tensioned by the strut, substantially as described.

11. In a harvesting machine of the class described, the combination with the grain platform, of an A frame member composed of a continuous metal bar, one portion of which is arranged vertically and the other diagonally and both secured at their ends to the platform and in line with the rear edge thereof, an elevator hinged to the end of the platform, a brace extending diagonally across and secured to the diagonal portion of the A frame and below its apex, a sheave carried by the upper end of said brace, and a suspension cable for the elevator running over said sheave and extending back to the driver's platform, substantially as described.

12. In a harvesting machine of the class described, the combination with an A frame composed of metal bars, of a T bar reel support connected to said A frame, a driving belt for the reel and a belt tightener comprising sheaves to receive the strands of the belt, a bolt passing through one of said sheaves and through the web of the reel support and angular washers carried by the bolt and adapted to be clamped thereby into the angle of the A frame bar, a slotted arm carrying the other sheave and the reel support being notched or cut away to receive the slotted arm, substantially as described.

13. In a harvesting machine of the class described, the combination with a rotatable driving axle, ground wheels and gear connections, of a beam mounted above and parallel to the axle, castings through which the axle is adapted to be drawn by means of a threaded bolt whose head is secured with one of said castings, the threaded end whereof is passed through a thimble and a lug, of a collar mounted upon the axle and nuts whereby the axle may be drawn through the castings and secured to insure the proper enmeshment of the gears, substantially as described.

14. In a harvesting machine of the class described, the combination with a driving axle secured with one of the ground wheels and rotatable in the hub of the other, of a beam mounted upon the axle and supporting the platform, a casting secured with the beam and through which the axle may slide and a take-up device between the axle and the casting carrying the beam whereby the axle may be moved longitudinally to secure proper adjustment of the gearing, substantially as described.

15. In a harvesting machine of the class described, the combination with a rotatable driving axle, ground wheels and gear connections, of a beam mounted above and parallel to the axle, castings through which the axle is adapted to be drawn by means of a threaded bolt whose head is secured with one of said castings, the threaded end whereof is passed through a lug of a collar mounted upon the axle and nuts whereby the axle may be drawn through the castings and secured to insure the proper enmeshment of the gears, substantially as described.

16. In a harvesting machine of the class described, the combination with a tilting platform, of a tilting lever and a perforated hanger for connecting the front end of said tilting lever with the platform and a lug on the front of the tilting lever forming a fulcrum for a detached hand lever when inserted in the perforations of the hanger, substantially as described.

17. In a harvesting machine of the class described, the combination with the tilting lever 40 having branch levers 41, 42, a sleeve 48 applied to the rear end of lever 40, said sleeve having a slot therein for a standard, and a lug for the truss rod, a standard passing through said slot, a truss rod for confining said sleeve and a spring actuated dog to engage the standard, substantially as described.

18. In a harvesting machine of the class described, the combination with a tilting platform, of a tilting lever therefor and a counter-balancing spring connected with the tilting lever and to a fixed part of the frame and arranged diagonally to the tilting lever and adapted to swing therewith, substantially as described.

19. In a harvesting machine of the class described, the combination with a tilting platform and a tilting lever therefor, a push pole, a brace bar, a bracket, and a U-bolt for clamping the brace bar to the push pole, and a counter-balancing spring connected with the tilting lever at one end and at the other to an extension of said bracket, substantially as described.

20. In a harvesting machine of the class described, the combination with the axle, of a beam mounted above and parallel to the axle, a casting clamped to said beam, a rest block pivoted in said casting, a tilting lever mounted on said rest block, and a main brace having a bearing on said casting, substantially as described.

21. In a harvesting machine of the class described, the combination with the main frame, of a beam mounted above and parallel thereto, a push pole and a tilting lever, and a three part casting clamped to the beam and push pole and forming a bearing for the axle and pivotally connected to the tilting lever, substantially as described.

22. In a harvesting machine of the class described, the combination with the main axle, of a beam mounted above and parallel thereto, a push pole and a tilting lever, of a three part casting clamped to the beam and push pole and forming a bearing for the axle and pivotally connected to the tilting lever, said casting being also vertically slotted to receive a gear shifting lever, and a clamping bolt passing through two parts of the casting and the push pole and transversely through said slot to provide a pivot for the shifting lever, substantially as described.

23. In a harvesting machine of the class described, a tilting lever composed of three tubular metallic members, two of said members being pivotally and detachably connected to the other, substantially as described.

24. In a harvesting machine of the class described, the combination with the grain platform, of standards rigidly connected with the rear edge thereof, said standards being arranged in pairs slightly separated and one of them being provided with locking notches in its front edge, a main axle, a collar on said axle, a U-shaped bearing on said collar, a U-shaped clamping bolt embracing said bearing and having its ends projected between the standards, a clamping plate confined to the front edges of the standards by the U-bolt, and a set screw or equivalent device carried by said clamping plate and adapted to enter the locking notches of the standard, substantially as described.

EZRA A. PECK.

Witnesses:
C. C. LINTHICUM,
FREDERICK C. GOODWIN.